United States Patent
Chuang

(10) Patent No.: US 11,451,444 B2
(45) Date of Patent: Sep. 20, 2022

(54) METHOD OF REPLACING A COMPONENT OF A BICYCLE WIRELESS CONTROLLING SYSTEM AND BICYCLE COMPONENT AND PORTABLE DEVICE APPLYING THE SAME

(71) Applicant: TEKTRO TECHNOLOGY CORPORATION, Changhua County (TW)

(72) Inventor: Hsun-Yu Chuang, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 0 days.

(21) Appl. No.: 17/158,336

(22) Filed: Jan. 26, 2021

(65) Prior Publication Data

US 2021/0288874 A1 Sep. 16, 2021

(30) Foreign Application Priority Data

Mar. 13, 2020 (TW) .................................. 109108362

(51) Int. Cl.
*H04L 41/084* (2022.01)
*H04L 41/0806* (2022.01)
(Continued)

(52) U.S. Cl.
CPC .......... *H04L 41/084* (2013.01); *B62M 9/122* (2013.01); *B62M 9/132* (2013.01);
(Continued)

(58) Field of Classification Search
CPC . H04L 41/084; H04L 41/0806; H04L 41/085; B62M 9/122; B62M 9/132; G06K 19/06028; H04W 4/18
See application file for complete search history.

(56) References Cited

U.S. PATENT DOCUMENTS

2016/0063782 A1* 3/2016 Yu ............................ B62J 45/20
  340/5.61
2016/0257370 A1* 9/2016 Hashimoto ............ B62K 25/28
(Continued)

FOREIGN PATENT DOCUMENTS

CN  204288479 U  *  4/2015
CN  105644704 A  *  6/2016  ............ B62M 25/08
(Continued)

OTHER PUBLICATIONS

A Completely Wireless Bike? Brakes, Shifting and Suspension! 12 (Year: 2021).*

*Primary Examiner* — Alina A Boutah

(74) *Attorney, Agent, or Firm* — Locke Lord LLP; Tim Tingkang Xia, Esq.

(57) ABSTRACT

This disclosure relates to a method of replacing a component of a bicycle wireless controlling system that includes the following steps: obtaining a first identification code related to a first component of the bicycle wireless controlling system by a portable device, wherein the first component is configured to be in communication connection with at least one another component of bicycle wireless controlling system through the first identification code; writing the first identification code into a second component by the portable device; and sending out the first identification code by the second component to be in communication connection with the at least one another component through the first identification code.

11 Claims, 5 Drawing Sheets

(51) Int. Cl.
*H04L 41/085* (2022.01)
*H04W 4/18* (2009.01)
*B62M 9/132* (2010.01)
*B62M 9/122* (2010.01)
*G06K 19/06* (2006.01)

(52) U.S. Cl.
CPC ...... *G06K 19/06028* (2013.01); *H04L 41/085* (2013.01); *H04L 41/0806* (2013.01); *H04W 4/18* (2013.01)

(56) References Cited

U.S. PATENT DOCUMENTS

| | | | |
|---|---|---|---|
| 2017/0012455 A1* | 1/2017 | Kato | B62J 45/40 |
| 2018/0183255 A1* | 6/2018 | Shahana | B62J 45/41 |
| 2018/0257736 A1* | 9/2018 | Komatsu | B62J 45/41 |
| 2018/0257737 A1* | 9/2018 | Komatsu | B62M 9/122 |
| 2019/0002053 A1* | 1/2019 | Kakinoki | B62K 19/40 |
| 2019/0127005 A1* | 5/2019 | Regnier | G01C 21/3632 |
| 2019/0246437 A1* | 8/2019 | Chuang | H04W 76/11 |
| 2019/0250619 A1* | 8/2019 | Gillett | B62K 23/02 |
| 2020/0187279 A1* | 6/2020 | Suzuki | H04W 52/0277 |
| 2020/0402039 A1* | 12/2020 | Storm | G06F 21/32 |
| 2021/0061412 A1* | 3/2021 | Kawakami | B62K 23/02 |
| 2021/0163097 A1* | 6/2021 | Liao | H04M 1/72412 |
| 2021/0170232 A1* | 6/2021 | Kabbash | A61B 5/0022 |
| 2021/0171156 A1* | 6/2021 | Kitano | B62M 9/122 |

FOREIGN PATENT DOCUMENTS

| | | | | |
|---|---|---|---|---|
| CN | 106878917 A | * | 6/2017 | ............ H04W 4/80 |
| CN | 110126971 A | * | 8/2019 | ............ B62M 25/08 |
| CN | 112788522 A | * | 5/2021 | |
| DE | 202017105217 U1 | * | 12/2017 | |
| DE | 102020208521 A1 | * | 3/2021 | ............ B62J 99/00 |
| JP | 6912418 B2 | * | 8/2021 | ............ B62J 43/30 |
| KR | 2018126279 A | * | 11/2018 | ................ B62J 6/00 |

* cited by examiner

METHOD OF REPLACING A COMPONENT OF A BICYCLE WIRELESS CONTROLLING SYSTEM AND BICYCLE COMPONENT AND PORTABLE DEVICE APPLYING THE SAME

CROSS-REFERENCE TO RELATED APPLICATIONS

This non-provisional application claims priority under 35 U.S.C. § 119(a) on Patent Application No(s). 109108362 filed in Taiwan, R.O.C. on Mar. 13, 2020, the entire contents of which are hereby incorporated by reference.

TECHNICAL FIELD

The present disclosure relates to a method of replacing a component of a bicycle controlling system, and a bicycle component and a portable device that apply the same, more particularly to a method of replacing a component of a bicycle wireless controlling system, and a bicycle component and a portable device that apply the same.

BACKGROUND

The brake system or the gear shift system of a conventional bicycle is worked by pulling a cable through a lever. However, the cable may be too tight or too loose, which causes not only poor operation on braking or gear shifting but also a repeat performance of tightening or loosening the cable. Or, the seat adjustment system of a conventional bicycle uses lubricant for easier adjustment. However, the lubricant may be contaminated with dust and dirt after application, which causes user's hands get dirty easily when unwantedly touches the contaminated lubricant during seat adjustment. Therefore, in order to prevent these problems, wireless controlling system are widely used on the brake system, the gear shift system and the seat adjustment system of bicycles.

A bicycle wireless controlling system generally includes many wireless components. Once one of two wireless components needs to be replaced due to failure or upgrade, the connection information of the other one component needs to be updated, which is inconvenient. Taking a gear shift system as an example, if an old derailleur is replaced by a new derailleur, a new connection information between the new derailleur and the original shift lever needs to be written into the new derailleur as well as the original shift lever. In this case, even the original shift lever is not faulty or doesn't need to be upgraded, an extra process still needs to be performed to update the connection information stored in the original shift lever.

SUMMARY

The present disclosure provides a method of replacing a component of a bicycle controlling system, and a bicycle component and a portable device that apply the same. According to the present disclosure, only the connection information in a new component needs to be updated, and thus the new component can be used as a component of the bicycle wireless controlling system which an old component was originally used, thereby accomplishing the replacement of the component of the bicycle wireless controlling system.

According to one aspect of the present disclosure, a method of replacing a component of a bicycle wireless controlling system includes the following steps: obtaining a first identification code related to a first component of the bicycle wireless controlling system by a portable device, wherein the first component is configured to be in communication connection with at least one another component of the bicycle wireless controlling system through the first identification code; writing the first identification code into a second component by the portable device; and sending out the first identification code by the second component to be in communication connection with the at least one another component through the first identification code.

According to another aspect of the present disclosure, a bicycle component includes a wireless communication unit configured to receive an identification code of another bicycle component through a communication connection from a portable device and to perform a communication connection with the identification code.

According to further another aspect of the present disclosure, a bicycle component includes a wireless communication unit configured to receive an identification code of another bicycle component through a communication connection from a portable device so as to use the identification code to replace a communication connection of the another bicycle component.

According to still another aspect of the present disclosure, a bicycle component includes a wireless communication unit configured to receive an identification code of another bicycle component through a communication connection to use the identification code as an identification information required for performing another communication connection.

According to still further another aspect of the present disclosure, a bicycle component includes a wireless communication unit configured to send out a paired identification conde to a portable device through a communication connection.

According to still further another aspect of the present disclosure, a portable device includes an identification code acquisition part and an identification code transmission part. The identification code acquisition part is configured to obtain a paired identification code of a first component through a communication connection. The identification code transmission part is configured to send the paired identification code of the first component to a second component through a communication connection.

In view of the above statement, the portable device only needs to obtain the first identification code related to the first component of the bicycle wireless controlling system and then to write the first identification code into the second component, and therefore the communication connection relationship(s) of the component(s) within the bicycle wireless controlling system can be changed. The portable device doesn't need to be in communication connection with other component(s) to update connection information stored in the other component(s). Accordingly, the processes of replacing the component of the bicycle wireless controlling system can be simplified.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
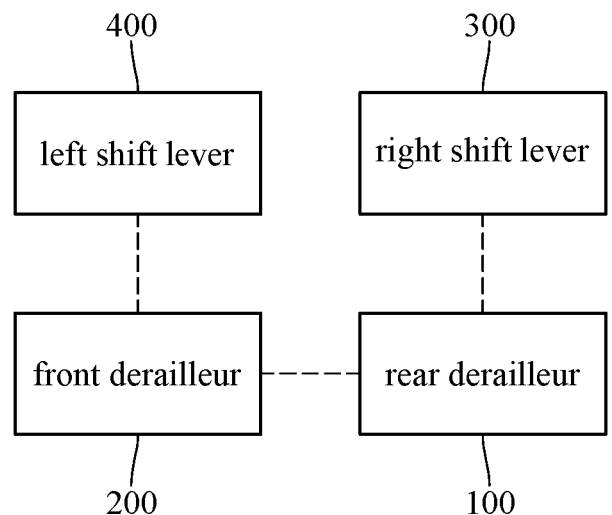
FIG. 1 is a block diagram of a bicycle wireless controlling system according to one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure is a method of replacing a component of a bicycle wireless controlling system 10, and a bicycle component and a portable device that apply the same. In the specification, the bicycle wireless controlling system 10 is exemplary in shifting bicycle gears. However, the present disclosure is not limited thereto. In some embodiments, the bicycle wireless controlling system may be applied to a bicycle brake system, a bicycle seat adjustment system, etc.

Figure 2:
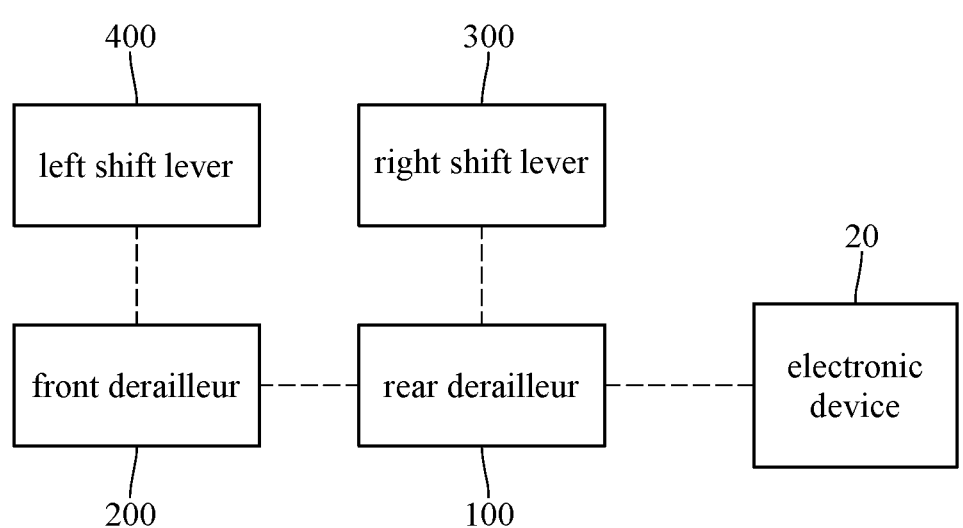
FIG. 2 is a block diagram of the bicycle wireless controlling system of FIG. 1 in communication connection with an electronic device.

Please refer to FIG. 1 and FIG. 2 for describing the bicycle wireless controlling system 10 of the present disclosure. FIG. 1 is a block diagram of the bicycle wireless controlling system 10 according to one embodiment of the present disclosure. FIG. 2 is a block diagram of the bicycle wireless controlling system 10 of FIG. 1 in communication connection with an electronic device 20.

The bicycle wireless controlling system 10 uses a wireless communication connection manner such as Bluetooth to achieve the function of shifting bicycle gears. Specifically, as shown in FIG. 1, the bicycle wireless controlling system 10 includes a rear derailleur 100, a front derailleur 200, a right shift lever 300 and a left shift lever 400. The rear derailleur 100 is in communication connection with the front derailleur 200 and the right shift lever 300. The front derailleur 200 is in communication connection with the left shift lever 400, such that the rear derailleur 100 is in indirect communication connection with the left shift lever 400 via the front derailleur 200. Since the right shift lever 300 is only in communication connection with the rear derailleur 100, the power consumption of the right shift lever 300 can thus be reduced. Similarly, since the left shift lever 400 is only in communication connection with the front derailleur 200, the power consumption of the left shift lever 400 can thus be reduced.

The rear derailleur 100 can move the bicycle chain from one rear sprocket wheel to another while the right shift lever 300 is pulled, and the front derailleur 200 may adaptively move the bicycle chain through the communication connection between the rear derailleur 100 and the front derailleur 200 so as to prevent friction between the bicycle chain and the front sprocket wheel. Similarly, the front derailleur 200 can move the bicycle chain from one front sprocket wheel to another while the left shift lever 400 is pulled.

The electronic device 20 such as user's mobile phone can be in communication connection with the rear derailleur 100 of the bicycle wireless controlling system 10. Specifically, as shown in FIG. 2, the electronic device 20 can be in communication connection with the rear derailleur 100 by running an app thereon. The electronic device 20 can read battery capacities of the rear derailleur 100, the front derailleur 200, the right shift lever 300 and the left shift lever 400, can change the default value for starting low battery protection of the rear derailleur 100, the front derailleur 200, the right shift lever 300 and the left shift lever 400, can read gear information of the rear derailleur 100 and the front derailleur 200, can shift gears of the rear derailleur 100 and the front derailleur 200, can update firmware of the bicycle wireless controlling system 10, or can write user information such as personal account numbers and passwords into the bicycle wireless controlling system 10 through the abovementioned direct or indirect communication connection between the rear derailleur 100, the front derailleur 200, the right shift lever 300 and the left shift lever 400. Further, the electronic device 20 can transmit data such as the user information to a cloud host (not shown) through a communication connection therebetween.

Hereinafter, three manners of establishing a communication connection between the electronic device 20 and the rear derailleur 100 will be described. In the first manner, there are two actuation buttons (not shown) respectively disposed on the right shift lever 300 and the left shift lever 400. When the actuation buttons are pressed at the same time, the right shift lever 300 and the left shift lever 400 notify the rear derailleur 100 to send out a connection broadcast, such that the electronic device 20 can receive the connection broadcast to establish a communication connection with the rear derailleur 100. In the second manner, there is another actuation button (not shown) disposed on the rear derailleur 100. When the another actuation button is pressed, the rear derailleur 100 can send out a connection broadcast, such that the electronic device 20 can receive the connection broadcast to establish a communication connection with the rear derailleur 100. In the third manner, the rear derailleur 100 sends out a connection broadcast within a predetermined time (e.g., 30 seconds) after being powered on, such that the electronic device 20 can receive the connection broadcast to establish a communication connection with the rear derailleur 100. In the three abovementioned manners, information such as user's personal account number and password can be used to authenticate the communication connection between the rear derailleur 100 and the electronic device 20.

In the bicycle wireless controlling system 10, the rear derailleur 100, the front derailleur 200, the right shift lever 300 and the left shift lever 400 each have an identification code so as to use the identification codes to authenticate the communication connections therebetween. The identification codes may be written therein during the process of manufacturing, and the identification codes, the communication connections therebetween and the user's information may be pre-stored in the abovementioned cloud host. When a component of the bicycle wireless controlling system 10 needs to be replaced due to failure or upgrade, the bicycle wireless controlling system 10 can apply the following method of the present disclosure.

Figure 3:
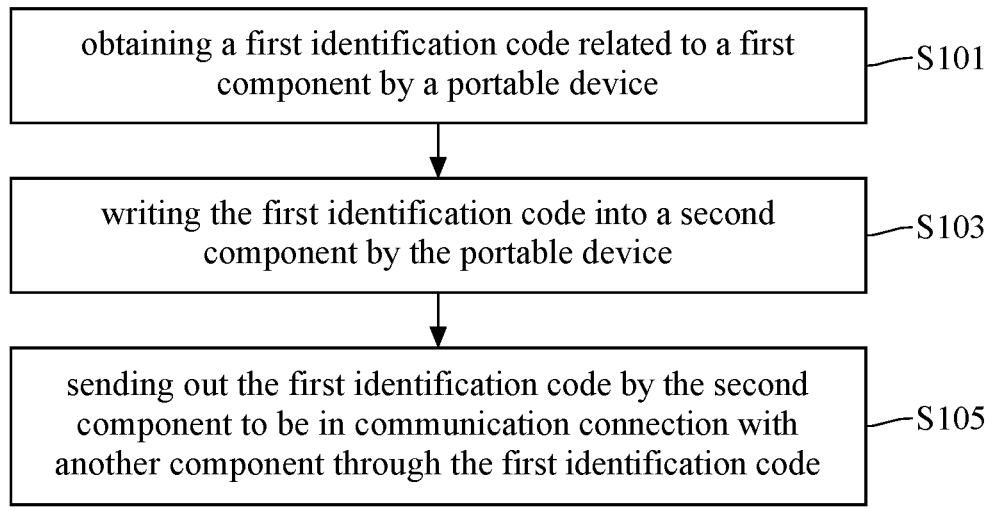
FIG. 3 is a flow chart of a method of replacing a component of a bicycle wireless controlling system according to another embodiment of the present disclosure.
Figure 4:
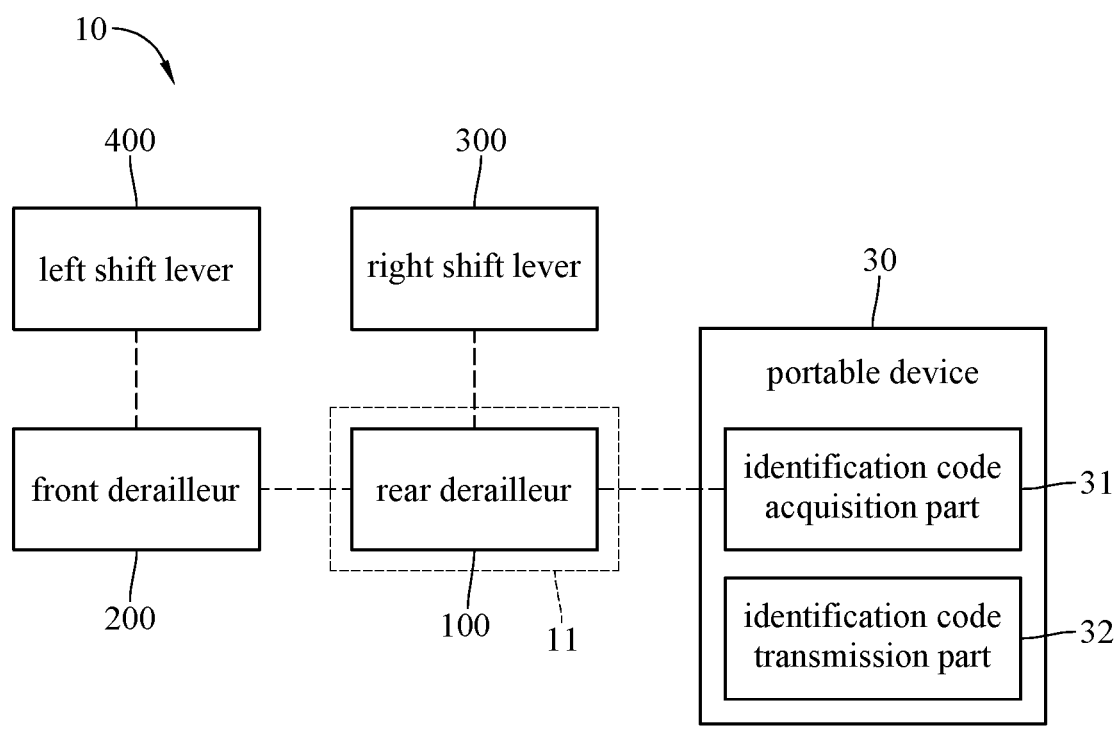
FIG. 4 to FIG. 6 are block diagrams that correspond to the method of replacing the component of the bicycle wireless controlling system of FIG. 3.
Figure 5:
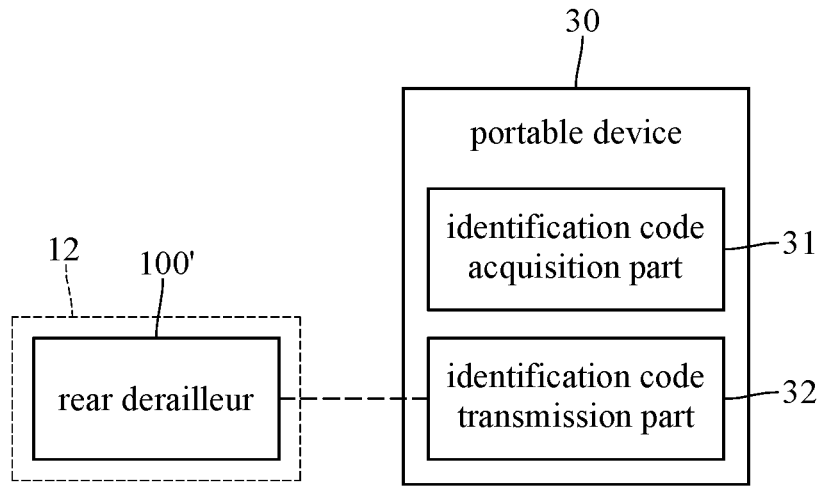
Figure 6:
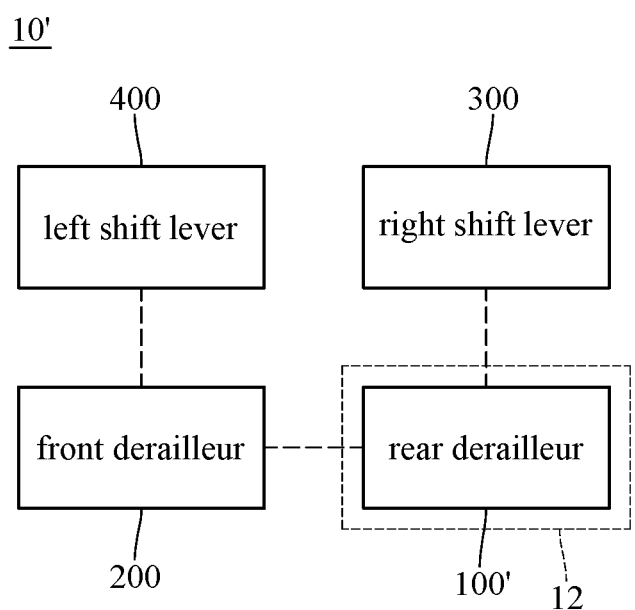

Please refer to FIG. 3 to FIG. 6. FIG. 3 is a flow chart of a method of replacing a component of the bicycle wireless controlling system 10 according to another embodiment of the present disclosure. FIG. 4 to FIG. 6 are block diagrams that correspond to the method of replacing the component of the bicycle wireless controlling system 10 of FIG. 3. The following description will be based on the embodiment of the rear derailleur 100 being replaced by a rear derailleur 100'. And in the following description, the rear derailleur 100 is considered as a first component 11, and the rear derailleur 100' is considered as a second component 12. Moreover, the second component 12 can also be considered as a bicycle component, and the first component 11 can also be considered as another bicycle component.

In this embodiment, in step S101, a portable device 30 such as a mobile phone from a bicycle repair station is used to obtain a first identification code ID1 related to the first component 11 of the bicycle wireless controlling system 10, wherein the first component 11 is, as abovementioned, in communication connection with another component of the bicycle wireless controlling system 10 such as the front derailleur 200 and the right shift lever 300 through the first identification code ID1. At this time, as shown in FIG. 4, a communication connection between the portable device 30 and the first component 11 is established. Specifically, in this and some embodiments, an identification code acquisition part 31 included in the portable device 30 is in communication connection with the first component 11 to read the paired first identification code ID1 pre-stored in the first component 11. However, the present disclosure is not limited thereto. In some other embodiments, the portable device 30 may include an input device (not shown) such as a barcode scanner that can read a barcode (e.g., a linear barcode or a matrix barcode) corresponding to the first identification code ID1 on a packaging box (not shown) or on the casing (not shown) of the first component 11. Alternatively, in some other embodiments, the portable device 30 may be in communication connection with the abovementioned cloud host so as to read the first identification code ID pre-stored in the cloud host.

In this embodiment, in step S103, an identification code transmission part 32 included in the portable device 30 is in communication connection with the second component 12 to transmit and write the first identification code ID1 into the second component 12. At this time, the communication connection between the portable device 30 and the second component 12 is shown in FIG. 5. In steps S101 to S103, it can also be understood that a wireless communication unit (not shown) included in the second component 12 receives the first identification code ID of the first component 11 through the communication connection between the portable device 30 and the first component 11 and then through the communication connection between the portable device 30 and the second component 12.

In step S105, the second component 12 sends out the first identification code ID to be in communication connection with the another component of the bicycle wireless controlling system 10, such as the front derailleur 200 and the right shift lever 300, through the first identification code ID1. Specifically, in this and some embodiments, the second component 12 sends out the first identification code ID within a predetermined time (e.g., 30 seconds) after being powered on. Since the abovementioned another component is already able to be in communication connection with the first component 11, it can be understood that the abovementioned another component has already performed a connection authentication process for the communication connection with the first identification code ID1. Therefore, the second component 12 can send out the first identification code ID1 to directly establish a communication connection with the abovementioned another component through the first identification code ID1 without performing any connection authentication process in advance. Further, since an extra connection authentication process is not needed for establishing the communication connection between the second component 12 and the abovementioned another component, the casing (not shown) of the second component 12 does not need to be provided with a button for performing the extra connection authentication process. Therefore, the design of the casing of the second component 12 can be simplified, thereby preventing moisture or dirt from entering into the second component 12 due to a gap around the button.

In this embodiment, the second component 12 can be used as the first component 11 originally used in the bicycle wireless controlling system 10 after the second component 12 is mounted and in communication connection with the another component. In detail, in the case that the first component 11 is the replaced rear derailleur 100 and the second component 12 is the rear derailleur 100' for replacing the rear derailleur 100, the bicycle wireless controlling system 10 becomes a bicycle wireless controlling system 10' that includes the rear derailleur 100', the front derailleur 200, the right shift lever 300 and the left shift lever 400, and the communication connections therebetween are shown in FIG. 6. In step S105, it can be understood that the second component 12 uses the first identification code ID1 as its authentication information to establish the communication connection with the another component to replace the first component 11. At this time, the wireless communication unit of the second component 12 can transmit the paired first identification code ID1 and a connection result between the second component 12 and the abovementioned another component with the first identification code ID1 to the portable device 30 through the communication connection therebetween, such that the portable device 30 can upload the connection result to the abovementioned cloud host to update data stored therein.

According to the method of replacing the component of the bicycle wireless controlling system discussed above, the portable device 30 only needs to obtain the first identification code ID1 related to the first component 11 (e.g., the rear derailleur 100 in this embodiment) and then to write the first identification code ID1 into the second component 12 (e.g., the rear derailleur 100' in this embodiment), and therefore the communication connection relationship(s) of the component(s) within the bicycle wireless controlling system 10 can be changed into the communication connection relationship(s) of the component(s) within the bicycle wireless controlling system 10'. The portable device 30 doesn't need to be in communication connection with other component(s) (e.g., the front derailleur 200 and the right shift lever 300 in this embodiment) to update connection information stored in the other component(s). Accordingly, the processes of replacing the component of the bicycle wireless controlling system 10 can be simplified.

The abovementioned embodiment of providing the method of replacing the rear derailleur 100 by the rear derailleur 100' is exemplary, and the present disclosure is not limited thereto. In some other embodiments, the first component to be replaced may be the front derailleur, the right shift lever or the left shift lever, and the second component for replacing the first component may be another front derailleur (not shown), another right shift lever (not shown)

or another left shift lever (not shown). In the case that the first component is the front derailleur, the second component (the another front derailleur) uses the first identification code from the first component (the front derailleur) to be in communication connection with the rear derailleur and the left shift lever, such that the second component can be used as the first component originally used in the bicycle wireless controlling system. In the case that the first component is the right shift lever, the second component (the another right shift lever) uses the first identification code from the first component (the right shift lever) to be in communication connection with the rear derailleur, such that the second component can be used as the first component originally used in the bicycle wireless controlling system. In the case that the first component is the left shift lever, the second component (the another left shift lever) uses the first identification code from the first component (the left shift lever) to be in communication connection with the rear derailleur, such that the second component can be used as the first component originally used in the bicycle wireless controlling system.

Figure 7:
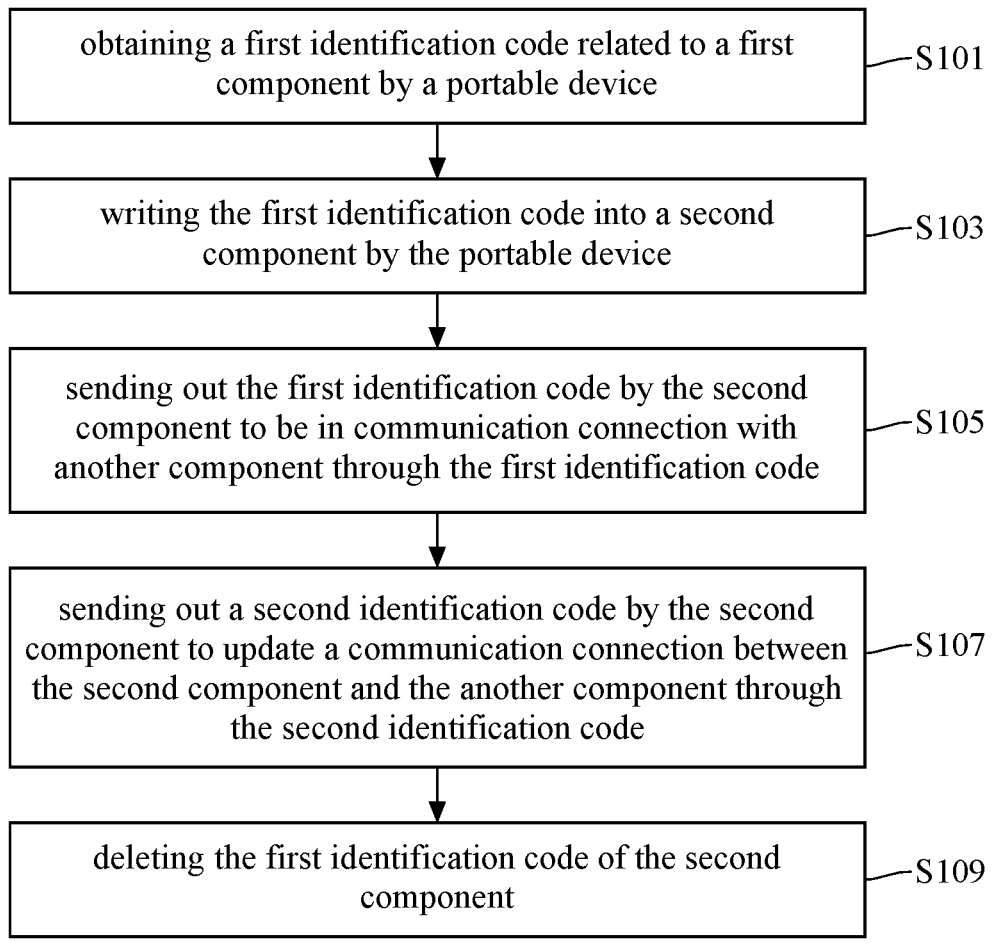
FIG. 7 is a flow chart of a method of replacing a component of a bicycle wireless controlling system according to still another embodiment of the present disclosure.

In some cases, it is noted that a second identification code ID2 may already be written into the second component 12 during the process of manufacturing the second component 12. Therefore, after performing step S103, the second component 12 will have two identification codes which are the first identification code ID1 and the second identification code ID2. And in step S105, the second component 12 only uses the first identification code ID1 to establish the communication connection though the second component 12 still has both the first identification code ID1 and the second identification code ID2 at the same time. However, the present disclosure is not limited thereto. Please refer to FIG. 7, which is a flow chart of a method of replacing a component of a bicycle wireless controlling system according to still another embodiment of the present disclosure. Note that only differences between this embodiment and the abovementioned embodiment will be described hereinafter. In this and some embodiments, step S107 is performed after step S105. In step S107, the second component 12 sends out the second identification code ID2 of the second component 12 to update the communication connection between the second component 12 and the abovementioned another component through the second identification code ID2. In detail, in the case that the first component 11 is the replaced rear derailleur 100 and the second component 12 is the rear derailleur 100' for replacing the rear derailleur 100, the first identification code ID used by the second component 12 (the rear derailleur 100') to be in communication connection with the front derailleur 200 and the right shift lever 300 is replaced by the second identification code ID2, while the communication connection between the front derailleur 200 and the left shift lever 400 will not be affected by this replacement. Accordingly, even if the first component 11 (the rear derailleur 100) sends out the first identification code ID again, the first component 11 will not re-establish a communication connection with the abovementioned another component (e.g., the front derailleur 200 or the right shift lever 300 in this embodiment). At this time, the wireless communication unit of the second component 12 can transmit the paired second identification code ID2 and a connection result between the second component 12 and the abovementioned another component through the second identification code ID2 to the portable device 30 through the communication connection therebetween, such that the portable device 30 can upload the connection result to the abovementioned cloud host to update data stored therein.

In step S109, the first identification code ID1 of the second component 12 is deleted. Specifically, the portable device 30 deletes the first identification code ID1 of the second component 12 and then disconnects the communication connection between the portable device 30 and the second component 12. However, the present disclosure is not limited thereto. In some other embodiments, the communication connection between the portable device 30 and the second component 12 may be disconnected first, and then the second component 12 may delete the first identification code ID1 thereof in a predetermined time after the second component 12 uses the second identification code ID2 to update the abovementioned connection result. In this and some embodiments, after the first identification code ID of the second component 12 is deleted, the second component 12 is in communication connection with the abovementioned another component through the second identification code ID2 thereof, and there is no more communication connection established through the first identification code ID1 in the bicycle wireless controlling system 10'.

Figure 8:
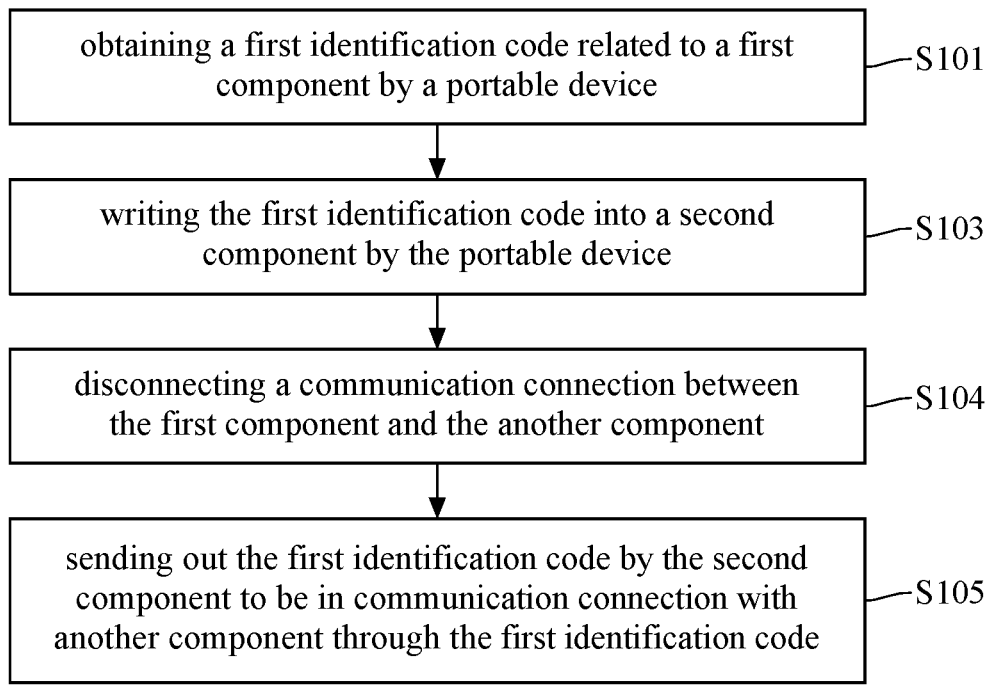
FIG. 8 is a flow chart of a method of replacing a component of a bicycle wireless controlling system according to further still another embodiment of the present disclosure.

Please refer to FIG. 8, which is a flow chart of a method of replacing a component of a bicycle wireless controlling system according to further still another embodiment of the present disclosure. Note that only differences between this and the abovementioned embodiments will be described hereinafter. In this and some embodiments, step S104 is performed after step S103. In step S104, the communication connection between the first component 11 and the abovementioned another component (e.g., the front derailleur 200 or the right shift lever 300 in this embodiment) is disconnected. Specifically, the first component 11 can be powered off to disconnect the first component 11 from the abovementioned another component, but the present disclosure is not limited thereto. In some other embodiments, the first component 11 may be moved out of a communication range of the abovementioned another component so as to achieve the effect of disconnecting the first component 11 from the abovementioned another component.

In view of the above statement, the portable device only needs to obtain the first identification code related to the first component of the bicycle wireless controlling system and then to write the first identification code into the second component, and therefore the communication connection relationship(s) of the component(s) within the bicycle wireless controlling system can be changed. The portable device doesn't need to be in communication connection with other component(s) to update connection information stored in the other component(s). Accordingly, the processes of replacing the component of the bicycle wireless controlling system can be simplified.

In some embodiments, the second component can send out the first identification code within a predetermined time after being powered on to directly establish a communication connection with another component through the first identification code without performing any connection authentication process in advance. Further, since an extra connection authentication process is not needed for establishing the communication connection between the second component and the abovementioned another component, the casing of the second component does not need to be provided with a button for performing the extra connection authentication process. Therefore, the design of the casing of the second component can be simplified, thereby preventing moisture or dirt from entering into the second component due to a gap around the button.

In some embodiments, the second component can send out the second identification code of the second component to update the communication connection between the second component and the abovementioned another component through the second identification code. Accordingly, even if the first component sends out the first identification code again, the first component will not re-establish a communication connection with the abovementioned another component.

The communication connection mentioned in the present disclosure refers to a connection manner that two components are able to exchange data with each other by, for example, wireless transmission.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A method of replacing a component of a bicycle wireless controlling system, comprising:
    obtaining a first identification code related to a first component of the bicycle wireless controlling system by a portable device, wherein the first component is configured to be in communication connection with at least one another component of the bicycle wireless controlling system through the first identification code;
    writing the first identification code into a second component by the portable device; and
    sending out the first identification code by the second component to be in communication connection with the at least one another component through the first identification code.

2. The method of replacing the component of the bicycle wireless controlling system according to claim 1, wherein after sending out the first identification code by the second component to be in communication connection with the at least one another component, the method further comprises:
    sending out a second identification code of the second component by the second component to update a communication connection between the second component and the at least one another component through the second identification code.

3. The method of replacing the component of the bicycle wireless controlling system according to claim 2, wherein after sending out the second identification code by the second component to update the communication connection between the second component and the at least one another component, the method further comprises:
    deleting the first identification code of the second component.

4. The method of replacing the component of the bicycle wireless controlling system according to claim 1, wherein obtaining the first identification code by the portable device comprises: reading a barcode corresponding to the first identification code by an input device of the portable device.

5. The method of replacing the component of the bicycle wireless controlling system according to claim 1, wherein obtaining the first identification code by the portable device comprises: connecting the portable device to a cloud host through a communication connection so as to read the first identification code pre-stored in the cloud host.

6. The method of replacing the component of the bicycle wireless controlling system according to claim 1, wherein obtaining the first identification code by the portable device comprises: connecting the portable device to the first component through a communication connection so as to read the first identification code.

7. The method of replacing the component of the bicycle wireless controlling system according to claim 6, wherein before sending out the first identification code by the second component to be in communication connection with the at least one another component, the method further comprises:
    disconnecting a communication connection between the first component and the at least one another component.

8. The method of replacing the component of the bicycle wireless controlling system according to claim 7, wherein disconnecting the communication connection between the first component and the at least one another component comprises:
    powering off the first component.

9. The method of replacing the component of the bicycle wireless controlling system according to claim 7, wherein disconnecting the communication connection between the first component and the at least one another component comprises:
    moving the first component out of a communication range of the at least one another component.

10. The method of replacing the component of the bicycle wireless controlling system according to claim 1, wherein sending out the first identification code by the second component comprises:
    sending out the first identification code by the second component within a predetermined time after being powered on.

11. A bicycle component, comprising:
    a wireless communication unit, configured to receive an identification code of another bicycle component through a communication connection from a portable device so as to use the identification code to replace a communication connection of the another bicycle component.

* * * * *